US006872895B2

(12) United States Patent
Cochran et al.

(10) Patent No.: US 6,872,895 B2
(45) Date of Patent: Mar. 29, 2005

(54) APPARATUS AND METHOD FOR PROVIDING SPATIALLY-SELECTIVE ON-LINE MASS OR VOLUME MEASUREMENTS OF MANUFACTURED ARTICLES

(75) Inventors: Don W. Cochran, Novelty, OH (US); Steven D. Cech, Aurora, OH (US)

(73) Assignee: Pressco Technology Inc., Cleveland, OH (US)

( * ) Notice: Subject to any disclaimer, the term of this patent is extended or adjusted under 35 U.S.C. 154(b) by 0 days.

(21) Appl. No.: 10/074,370

(22) Filed: Feb. 12, 2002

(65) Prior Publication Data
US 2003/0159856 A1 Aug. 28, 2003

(51) Int. Cl.[7] .............................................. G01G 17/00
(52) U.S. Cl. ................. 177/1; 177/210 R; 177/DIG. 6; 356/239.4; 702/40; 702/137
(58) Field of Search ................................ 177/1, 210 R, 177/DIG. 6; 356/239.4, 432; 702/23, 28, 40, 134, 135, 137, 175

(56) References Cited

U.S. PATENT DOCUMENTS

| | | | |
|---|---|---|---|
| 3,684,089 A | | 8/1972 | McMeekin .................... 209/82 |
| 4,304,995 A | | 12/1981 | Huttunen et al. ........... 250/339 |
| 4,486,136 A | | 12/1984 | Howard ........................ 414/21 |
| 4,510,389 A | | 4/1985 | Fumoto ...................... 250/339 |
| 4,720,808 A | * | 1/1988 | Repsch ........................... 177/1 |
| 5,138,178 A | * | 8/1992 | Wong et al. .................... 177/1 |
| 5,291,271 A | | 3/1994 | Juvinall et al. ............. 356/382 |
| 5,291,422 A | * | 3/1994 | Esztergar ....................... 177/1 |
| 5,354,984 A | * | 10/1994 | Baldwin ...................... 356/240 |
| 5,585,603 A | * | 12/1996 | Vogeley, Jr. .................... 177/1 |
| 5,591,462 A | | 1/1997 | Darling et al. .............. 425/173 |
| 6,211,952 B1 | | 4/2001 | Weiland et al. ........... 356/239.4 |
| 6,424,414 B1 | | 7/2002 | Weiland et al. ........... 356/239.4 |

FOREIGN PATENT DOCUMENTS

WO  WO 01/65204 A1  9/2001
WO  WO 02/33349 A1  4/2002

OTHER PUBLICATIONS

Letter to customers entitled "Introducing PETWall—on–line wall thickness monitoring system" signed by David Dineff of Agr TopWave (available at least as early as Jan. 24, 2002).

(Continued)

*Primary Examiner*—Randy W. Gibson
(74) *Attorney, Agent, or Firm*—Fay, Sharpe, Fagan, Minnich & McKee, LLP (57) ABSTRACT

This invention relates to a method and apparatus for mass and/or volume measurements of manufactured articles. More particularly, this invention relates to a method and apparatus for mass and/or volume measurements that can be performed on-line in a part manufacturing process. On-line measurement of the mass or volume of material contained in a specific region of interest of the manufactured items is performed 100% on-line. Real-time process control information is based on real-time measurement of the mass or volume of material contained in a specific region of interest of a manufactured item. Automated quality control inspection for manufactured articles is based on real-time measurement of the mass or volume of material contained in a specific region of interest of manufactured items. A manufacturing closed-loop process is directly corrected to keep it within control limits based on real-time measurement of the mass or volume of material contained in a specific region of interest of manufactured items soon after these items are manufactured.

48 Claims, 7 Drawing Sheets

OTHER PUBLICATIONS

PETWall product literature distributed by Agr TopWave (available at least as early as Jan. 24, 2002).

Product literature for Agr TopWave entitled "Quality Testing Systems for Plastic Containers and Preforms" (available at least as early as Jan. 24, 2002).

Literature of Agr TopWave for "Hand Held Thickness Probe 2000" (available at least as early as Jan. 24, 2002).

Letter to customers from Agr TopWave from David Dineff (Nov. 15, 2000).

Press release regarding "Non–Contact Measurement", B & P News Pages, International Bottler & Packer (Dec. 2000).

Product literature of Agr TopWave for "Hand Held Thickness Probe 2000"(available at least as early as Jan. 24, 2002).

* cited by examiner

APPARATUS AND METHOD FOR PROVIDING SPATIALLY-SELECTIVE ON-LINE MASS OR VOLUME MEASUREMENTS OF MANUFACTURED ARTICLES

BACKGROUND OF THE INVENTION

This invention is directed to an apparatus and method for providing spatially-selective on-line mass or volume measurements of manufactured articles. More specifically, it pertains to the use of optical emitters, detectors, and field-of-view (FOV) limiting optical elements to provide a system for monitoring the volume or mass of material contained within a prescribed region of a discretely manufactured part. The system makes mass or volume measurements on dynamic parts, typically as they are being fabricated and/or conveyed in a manufacturer's plant.

While the invention is particularly directed to the art of high-speed automated product measurement, process control, and inspection, and will be thus described with specific reference thereto, it will be appreciated that the invention may have usefulness in other fields and applications. For example, the invention will also find useful application in a wide range of environments where non-destructive and comprehensive measurement of physical parameters is desired.

The use of sensor-based instrumentation to deduce the amount of material being consumed or applied by an industrial or commercial process is well known in the art. As a most basic example, the fuel gauge of an automobile provides the operator of the vehicle with a real-time measure of the amount of fuel remaining in its gas tank. Similar process monitors, whether they be tuned to measure volume, number or mass, are deployed in a vast number of manufacturing operations in a wide number of industries.

The use of sensor-based mass or volume measurement instrumentation to quantify the mass or volume of individual articles which are either produced or handled by an automated operation are not as widely known. However, examples do exist. U.S. Pat. No. 4,486,136, entitled "Device for Determining Weight of Objects Being Moved," describes a system which determines the weight of logs, poles, or beams as they are being moved by a loader.

What is more typical, especially in those cases of high-speed manufacturing or conveyance operations, is the use of statistical product sampling and off-line quantification techniques. Using this manufacturing philosophy, a small percentage of the product that is manufactured or handled is diverted off the manufacturing line wherein its mass, volume or other attributes are quantified to a high degree of accuracy. This information is then used to deduce the quality or status of the product and/or manufacturing process.

In industries related to the manufacture of containers (food and beverage containers in particular), this model is generally followed. Containers are discrete items that are manufactured at high-speed. The amount of material used to construct a given item is an important manufacturing control parameter that effects the viability, quality, and profitability of the operations. The proper volume and distribution of material within a formed container is critical to the manufacturer's success in forming and selling the part. As such, the container industry has deployed a number of container measurement techniques that assist in determining whether manufacturing operations are in proper control. As an example, U.S. Pat. No. 5,591,462 describes the integration of a camera-based visual inspection system into a stretch blow-molding system used to form polyethylene terephthalate (PET) bottles. The inspection system is used to check for structural container defects such as holes or chipped sealing surfaces. This system is described as operating on-line as the containers are being inspected. In this capacity, it is capable of inspecting 100% of the parts being manufactured. This system does not have any means to determine or measure the mass or volume of the component under test.

U.S. Pat. No. 3,684,089, entitled "Container Wall Thickness Detection," describes an instrument that can be used to gauge the thickness of the walls of a formed container. This system is based on capacitance sensing. It requires that the instrument come into direct contact with the object to be quantified. Many improvements to this basic technique can be identified in the prior art. All these related developments provide useful off-line characterization of the distributed material contained within a sampling of formed containers.

Similar off-line measurements of the wall thickness of formed containers can be made using infrared absorption techniques. U.S. Pat. No. 4,304,995, entitled "Method and Apparatus for Measuring the Wall Thickness in a Plastic Article," describes a system that is used to measure the wall thickness of a hollow rotation-symmetrical plastic article. It performs this measurement by inserting a reflecting means inside the article under inspection and using this reflector to re-direct infrared energy emitted from outside the article onto a detector also located outside the article. U.S. Pat. No. 4,510,389, entitled "Infrared Film Thickness Gage," describes a similar instrument but the source of infrared radiation is located inside the article under inspection and the detection means is located outside the article. In either case, the requirement to physically insert something within the article or container in order to facilitate the measurement makes these techniques practical and useful only in off-line sampling of the manufactured product.

U.S. Pat. No. 5,291,271, entitled "Measurement of Transparent Container Wall Thickness," describes an apparatus which is used to measure the wall thickness of a container at a specific point. This system is based on the operation of a laser and a detector array which are used to measure reflections off both the outer and inner surface of a transparent container. In doing so, the thickness of the container at the entry point of the laser can be deduced.

Another process control operation, which is widely used in the PET container manufacturing industry, is off-line container sectioning and weighing tests. Containers which are produced by a manufacturing process are sampled—a few every hour or shift, depending on the plant's quality control plans—and diverted to a destructive testing process. There, the containers are generally cut into 3 parts: the base region, the sidewall region, and the opening or finish region. The mass of the PET material contained in these 3 general regions of the container are determined using a scale and the values recorded. The amount of plastic contained in these 3 general regions of the container is an important indicator to the plant operators of the real-time quality of the container manufacturing operations.

Over the years, the base mass or, alternatively, sidewall mass has become a well-understood attribute indicative of the quality of the manufacturing process. More specifically, the amount of PET material resident in specific portions of the container (such as the base region or the sidewall region) is indicative of whether the containers are being properly formed by the stretch blow-molding process. In order for the container to meet quality standards which have been established for it, the PET material which is contained in the molded preform blank (this entity is the start of the bottle forming process) needs to be properly redistributed throughout the finished container. Again, the act of quantifying the mass of the PET material in general regions of the container using bottle sampling and sectioning techniques is a frequently used technique by the manufacturers of these items. It provides useful, but not timely, information that allows them to improve the quality of their manufactured product and increases their profitability.

Currently, there are no known methods of providing spatially-selective mass or volume measurements on 100% of formed containers, such containers being manufactured or conveyed in a manufacturer's plant. Heretofore, technical limitations have made it virtually impossible to obtain on-line mass or volume measurements that are essentially equivalent to the type provided using off-line sectioning and weighing techniques.

SUMMARY OF THE INVENTION

The present invention is directed to an apparatus and method for providing spatially selective mass or material volume measurements of articles which are produced and/or presented at high rates of dynamic speed. In accordance with a preferred form of this invention, an electro-optic sensor with a FOV-defining optical path for receiving optical radiation of a specific wavelength is provided. In conjunction with the sensor, a light or source of electromagnetic radiation is provided for emitting radiation at a wavelength to which the sensor is tuned to be responsive. In addition to these components, an article tracking system to direct the sensor's data acquisition cycle and a processing/user interface system to process the measurement output of the sensor are preferably included.

According to another aspect of the invention, method steps comprise situating the sensor and the source of controlled electromagnetic radiation on opposite sides of the article to be measured, tuning the light source and/or sensor to a wavelength wherein significant, but not complete, absorption of the incident radiation occurs, fixing the FOV of the sensor/radiation source pair to ensure that only a well defined area of an article (such as the base of a container) is exposed during subsequent sampling of all of the energy not absorbed by the volume of material contained in said FOV, sampling the sensed radiation in a short time period consistent with its dynamic speed relative to the sensor/radiation source pair, and finally converting the sampled absorption-related measurement into a relative mass or volume measurement.

An object of the present invention is to provide for 100% on-line, non-contact and non-destructive measurement of the mass or volume of material contained in a specific region of interest of a manufactured item.

Another object of the present invention is to provide real-time process control information based on real-time measurement of the mass or volume of material contained in a specific region of interest of a manufactured item.

Yet another object of the present invention is to provide a means for 100% automated quality control inspection for manufactured articles based on real-time measurement of the mass or volume of material contained in a specific region of interest of a manufactured item.

Yet another object of the present invention is to either manually, semi-automatically, or fully automatically close the process loop and correct the actual manufacturing process directly to keep it within control limits based on real-time measurement of the mass or volume of material contained in a specific region of interest of a manufactured item.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention exists in the construction, arrangement, and combination of the various parts of the device, and/or the steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

For the purposes of illustration, the following description and figures describe the subject invention in the context of a specific application for measuring the base mass or material volume of formed PET bottles. However, it should be obvious to anyone skilled in the art that the methods and apparatus that are described herein can be applied to a variety of other application areas both outside and within the container industry. Moreover, the showings in the drawings are for purposes of illustrating the preferred embodiments of the invention only for one specific application and not for purposes of limiting same.

It should be understood that, by "looking" at an article or object (such as a formed PET bottle) under examination with selective multiple fields of view, valuable information can be gleaned about the mass/volume of one region vs. another or the relationship between concentric regions. According to the present invention, this approach can be embodied in a system having a single sensor that looks at a single fixed field of view or a single sensor that "looks" at multiple fields of view by way of aperture or lens changes. It can also be embodied in a system using multiple sensors—each of which has its own fixed field of view or multiple selective fields of view. Further, each of the multiple sensors may be used to collect data from different but, perhaps, overlapping portions of the object or from different material types contained within the object or article. It further can be embodied in a system utilizing one or more cameras as the sensors. A modern camera is inherently an array of sensors which can be used in conjunction with the appropriate processor, software, and user interface to facilitate ultimate flexibility for measuring mass or volume of selected regions. The camera type embodiment may or may not be a preferred embodiment for any given application at the present time because it dictates a higher cost solution than may be desirable and certain technologies may not yet be readily available to be deployed in such applications.

Figure 1A:
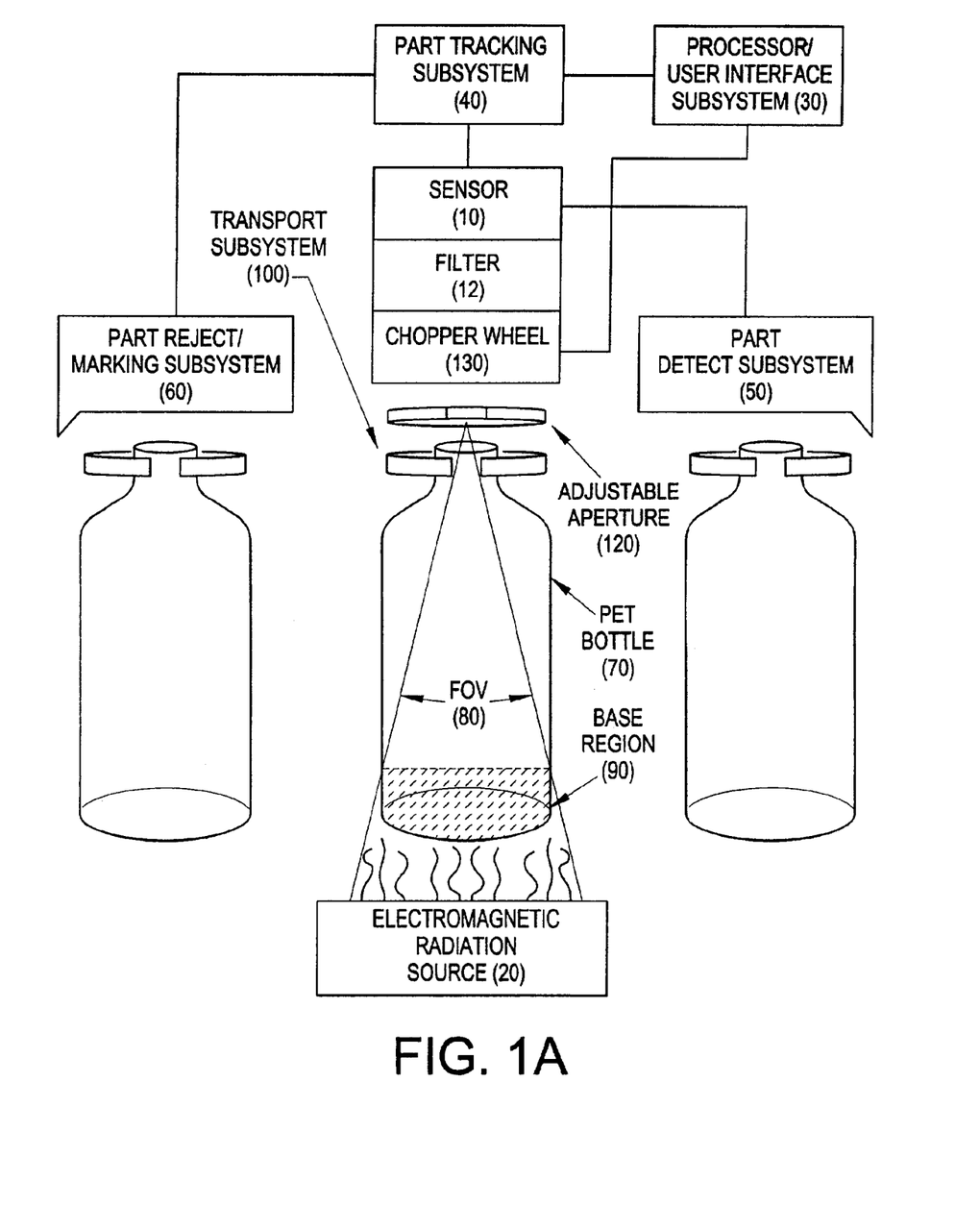
FIG. 1A is an illustration of an on-line mass/volume measurement system according to a preferred embodiment of the present invention.

A preferred system according to the subject invention is illustrated in FIG. 1A. As shown, the system includes a sensor, or sensor apparatus, 10, a filter 12 that is provided to or configured as a part of the sensor 10, an electromagnetic radiation or signal source 20, a processor/user interface subsystem 30, a part tracking subsystem 40, a part detection subsystem 50, and a part reject/marking subsystem 60. Also shown is an article or object positioning subsystem such as a transport subsystem 100, a device to establish a field of view 80 such as an aperture mechanism or plate 120, and a chopper wheel 130.

Generally, objects or articles such as PET bottles 70 are transported on the transport subsystem 100 to be placed in a selected position such as into the field of view (FOV) 80 for inspection and/or measurement purposes. It is to be appreciated that, preferably, the inspection and/or measurement is high speed in nature. Although, the principles of the present invention could be applied equally as well to an off-line system.

More specifically, a sensor 10—which could take the form of any of a variety of electromagnetic wavelength sensors—is positioned above, and in close proximity to, an object to be inspected. In certain plastics applications, the sensor is preferably an infrared sensor. However, in certain other applications, an ultraviolet sensor may be preferred. Moreover, the sensor 10 may comprise a single sensor, multiple sensors, or a camera. In addition, in a multiple sensor application, it may be desirable to provide some sensors in the infrared range and others in the ultraviolet range. Preferably, the object takes the form of a PET bottle 70 having an opening or finish region that can be positioned to face the sensor. In any configuration, preferably, the detection axis of the sensor 10 is aligned with the central axis of the bottle 70. As such, the sensor 10 has an unobstructed view of a base region 90 of the bottle 70. A sidewall region of the bottle 70 is disposed between the finish region and the base region.

The filter 12 is preferably a wavelength filter that may take a variety of forms that are well known in the art. In the preferred embodiment of the invention, the operational wavelength of the system is defined using an optical bandpass filter 12 that is placed over the detector element located in the sensor 10. The use of multi-layer dielectric coatings deposited on optical substrates to create wavelength specific filters is well known in the art. Using these techniques, filters can be created and integrated into the optical path of the sensor to provide a pass-through window that limits the system's response to only wavelengths (or wavelength ranges) that exhibit advantageous absorption in the material to be measured.

It should be understood that a system may be implemented without a filter. In such a case, a sensor is selected that contains a detector element whose natural and limited responsiveness to radiation acts to limit the system's responsiveness to specific wavelength ranges wherein advantageous absorption of the signal takes place.

In a further preferred embodiment where selection of operating wavelength is desired, a filter wheel may be provided. In such a configuration, various operational wavelengths may be utilized by the system depending on the objectives of the user.

A source of electromagnetic radiation 20, which in a preferred embodiment consists of a number of infrared lamps closely packaged together and sufficiently diffused via the action of ground glass diffusers, is disposed on the underside of the bottle 70 during inspection. Alternatively, an infrared heating plate can be used. In still further embodiments, ultraviolet sources may be desired. Where multiple sensors are implemented, it may be desired to use a multi-spectral source which supplies both ultraviolet and infrared energy of appropriate wavelengths. Of course, it is to be appreciated that the source of radiation may take a variety of forms so long as it is compatible with the sensor 10 and the article being measured. In this regard, the signal source of electromagnetic radiation is operable so that at least a portion of its emitted wavelength spectrum is partially absorbed by the article to produce an absorption-based signal to be passed through the system. The absorption-based signal is ultimately detected by the sensor, which produces an analog or digital signal based thereon. In one form where no filter is required in the system, the electromagnetic radiation source has a natural and limited emission spectrum that acts to limit the system's responsiveness to specific wavelength ranges wherein advantageous absorption of the signal takes place. For example, solid state light emitting diodes (LEDs) could be used as the source in such a configuration. Moreover, the (LEDs) may be electrically pulsed in order to modulate received signals at a known electrical frequency advantageous to subsequent signal processing operations. A FOV 80 of the radiation source 20/sensor 10 pair is preferably fixed to match the physical extent of the base region 90.

The processor/user interface subsystem 30 takes the preferable form of a processor system that communicates with a user through a monitor, mouse, keyboard, touch-screen, etc. Such systems are well known in the art. Likewise, the part tracking subsystem 40 configured to track article positions, the part detect subsystem 50 configured to detect articles, and part reject/marking subsystem 60 configured to selectively remove or mark articles based on selected criteria are well known in the automated control and inspection field and are adapted to accommodate the present invention. In the preferred embodiment, the part tracking subsystem 40 is used to provide the precise acquisition timing signals that are required to allow measurements to be made through the small top opening or finish region of the bottle 70 as it is being transported to pass within the field of view of the sensor 10 via a transport subsystem 100. The part tracking subsystem 40 interfaces with a part detect subsystem 50 which assists in providing suitable acquisition timing signals. The part tracking subsystem 40 also interfaces with a part reject/marking subsystem 60 which acts to reject or otherwise mark bottles which fall outside pre-defined limits of acceptable base mass and/or volume.

An adjustable aperture plate 120 is shown in the preferred embodiment. In this way, the FOV 80 can be fixed at its proper setting, co-aligned with the base region 90, by using FOV-limiting optics or apertures local to the sensor 10. In the alternative, the FOV 80 is defined using FOV-limiting aperture plates (not shown in FIG. 1A but similar to those described herein) placed directly over the radiation source 20 (similar to the configuration shown in FIG. 1C). In a still further alternative, the aperture plate 120 may be replaced with a lens system that would establish and maintain a field of view (similar to the configuration shown in FIG. 2). A lens system would be particularly advantageous if the sensor 10 took the form of a camera. In any of these cases, it would be additionally advantageous if the FOV 80 was remotely adjustable via servo-driven motors or other control devices (not shown).

Referring back now to FIG. 1A, in the preferred embodiment, a high-speed rotating or oscillating chopper wheel 130 is deployed in front of the radiation-sensitive detector or sensor 10. The chopper wheel may be integrated into the sensor apparatus. In operation, this chopper wheel 130 would be used to alternately expose and then shield the detector from radiation that has passed through the base region 90 of the PET bottle 70. This action converts the absorption-based radiation signal into an alternating/AC signal that is then detected and signal-processed within the sensor 10. That is, the chopper wheel acts to modulate the received signal at a known electrical frequency advantageous to subsequent signal processing operations. The technique of chopping the input signal of detector-based instrumentation is well known in the art. The use of a mechanical chopping mechanism, such as a chopper wheel, has long been established as a means of reducing large DC signal components which result from both detector dark resistance as well as, in the case of infrared detectors, generalized background radiation. Large DC signal components reduce the useful dynamic measurement range of detector-based instrumentation if they are not substantially filtered out of the input signal. In the disclosed invention, the use of a high-speed rotating chopper wheel 130 operating at a chop frequency greater than 1,000 Hz effectively reduces this DC signal component and still allows the system to synchronize on and acquire data from rapidly moving parts. It should be further understood that the chopper wheel could also be provided to the radiation source, as opposed to being local to the sensor.

In general operation, radiation emitted from the electromagnetic radiation source 20 travels in the direction of the entrance aperture of the sensor 10. Along the way, a portion of the energy or emitted wavelength spectrum is absorbed by the volume of PET material contained in the base region 90 of the PET bottle 70. By careful selection of the operating wavelength range of the sensor 10/radiation source 20 pair (through use of the filter 12), any absorption occurring in the base region 90 will be due to molecular absorption related to the base PET material or the material chosen to be measured. If the wavelength range is properly selected, it would in no significant way be based on absorption caused by the presence of colorant, dye, or other material blended with the PET stock.

The energy that is not absorbed by the integrated volume of PET material contained in the base region 20 continues on to the sensor 10 wherein a measurement of the incident signal is possible. Within the sensor 10, the measured analog signal which is indicative of the amount of material contained in the base region 20 of the PET bottle 70 is digitally converted and sent on to a processor/user interface subsystem 30. The processor/user interface subsystem 30 converts the digital measurement value into a meaningful mass or volume metric. It should be understood that the volume preferably contemplated is the volume of material in a specific region of the object (or bottle), not the volume of the object (or bottle). It can also be used to collect and display measurement statistics related to the mass or volumes of the PET material contained in the base region 90 and/or apply HI/LO threshold processing for the purpose of subsequent out-of-limits rejection of the measured bottles. It should be understood that HI/LO threshold processing may also include the special case of simply determining whether any amount of material is detected.

As those skilled in the art of process control and/or instrumentation will appreciate, the conversion of the signals detected by the sensor 10 to a meaningful metric may be accomplished, for example, by normalizing the signal detected in the presence of the bottle. This may be accomplished via a simple division of that signal by a reference signal detected just prior to the bottle being placed in the field of view. Next, the normalized signal is multiplied by a gain and adjusted by an offset factor to obtain a mass or volume measurement.

Of course, the selection of the gain and offset factors will depend on the data sought to be calculated (e.g. mass or volume) and will further depend on the experimental results achieved through calibration of the system using known mass or volumes. In this regard, to determine the gain and offset factor, a number (e.g. 2–100 or more), sample objects are initially placed in the field of view to obtain absorption readings. The sample objects or bottles are then cut (if necessary) and the portions of the objects within the field of view (e.g. base regions of the bottles) are measured to obtain a mass or material volume. These measurements are then plotted versus the corresponding absorption measurements to obtain a line. In this regard, the plotted points are fit to a line preferably using standard tools to conduct, for example, a least squares technique. Once an equation for the line is determined, the gain and offset for the system is apparent. That is, a typical line has an equation of y=mx+b. So, in this system, m is the gain and b is the offset. As such, during the subsequent running of the system, the mass or volume (i.e. "y") can be calculated by using the normalized signal (i.e. "x"), where the normalized signal is the detected signal divided by the reference signal obtained just prior to the object entering the field of view.

Further, the absorption characteristics of materials such as PET are well known and the amount of absorption that occurs as a beam of electromagnetic radiation passes through a dielectric material is related to the thickness of the material in the following manner.

$$\text{Absorption} = A(\lambda, t) = 1 - e^{-\alpha(\lambda)t}$$

Here, the term t represents the thickness of the dielectric and $\alpha(\lambda)$ is the absorption coefficient of the particular dielectric material in question. The absorption coefficient $\alpha(\lambda)$ is a parameter that varies greatly as a function of wavelength $\lambda$ of the transmitted beam. The operation of the subject invention is dependant, at least in part, on tuning the wavelength of operation of the sensor 10 and/or electromagnetic radiation source 20 so that midrange absorption (between 0 and 1) is occurring over the complete thickness ranges typical of the part being measured. That is, it would be not be advantageous to operate the subject invention in regions wherein there was very little or, alternatively, too much absorption of the of the subject source radiation. Rather, accurate and meaningful measurements are best made wherein the amount of absorption is nominally around 0.50. This allows for a useful measurement dynamic range for material thickness both above and below the nominal thickness. In the preferred embodiment, a wavelength range between 2.4 and 2.5 µm provides good material measurement characteristics for the specific application of quantifying the mass and/or volume of the PET material contained within the base region 90 of PET bottle 70. Other operational wavelength regions would similarly support absorption-based measurements of PET articles.

In the disclosed invention, a single ray or photon of energy emitted by the radiation source 20 passes through a varying amount of PET material, the actual distance being position-dependant upon where exactly the line-of-sight distance with the sensor 10 aperture happens to intersect the base region 90. A ray which needs to pass through the thick central portion of the base region 90 (an area referred to as the gate) will necessarily need to travel through more PET material, and thus experience more material absorption, as compared to a ray which naturally passes through the thinner outer portions of the base region 90. As such, the total amount of signal energy received at the sensor 10 is a measure of the integrated sum of all of the energy emitted by the radiation source 20 that is not absorbed by the PET material contained within the complete base region 90.

The present system, as configured with a single sensor, simultaneously samples the amount of absorption occurring at all points within the base region 90. Experimental testing has shown that this spatially integrated measurement technique results in an overall absorption-dependant reading which is very linear as a function of contained mass and/or volume. Furthermore, this measurement technique is inherently immune to measurement errors which might occur due to the presence of small, localized defects/perturbations occurring within the base region 90. PET articles that are formed via a stretch blow molding process are notoriously marked with small bubbles, bumps, scratches, and other localized surface deviations. Also, bottles or manufactured components are increasingly being manufactured with complex geometrical shapes which cause non-orthogonal views through the article which render any given point measurement to potentially be invalid. These imperfections, and geometric shapes, while commercially acceptable in many instances, nonetheless limit the ability of any type of conceived on-line instrumentation to perform accurate absorption-based thickness measurements on any one specific point within the article. This reality contradicts any attempt to quantify, in an on-line fashion, the localized PET distribution characteristics of a formed PET article by using a series of isolated point thickness measurements. Even multi-point sophisticated averaging or signal conditioning algorithms may have a low probability of reliably distinguishing aberations or structure from out of tolerance thickness. The present invention overcomes the effects of localized surface deviations by sampling the absorption characteristics of, for example, the complete base region 90 with a single integrated instrument reading. In this fashion, single point perturbations in the material and the measurement errors they introduce are averaged out of the reading.

As such, in the preferred embodiment of the disclosed invention, the following exemplary operational sequence is used. As the PET bottle 70 is transported towards the sensor 10/radiation source 20 axis on the transport subsystem 100, an acquisition signal is issued by the part tracking subsystem 40 at a fixed point prior to the bottle 70 being within the prescribed FOV 80 of the invention. The signal that is generated at this time within the sensor 10 is sampled and the value sent on to the processor/user interface subsystem 30. This value represents the unobstructed reference value for the next bottle measurement. Subsequent to performing this reference measurement, at a time wherein the PET bottle 70 has now moved and its opening is co-aligned with the sensor 10/radiation source 20 axis, a second acquisition signal is issued by the part tracking subsystem 40. A second reading is then sampled and sent by the sensor 10. This second value is a representation of the amount of absorption caused by the base region 90 of the PET bottle 70. It should be understood that this representation is based on the absorption principles outlined above. Within the processor/user interface subsystem 30, the reference value is used to normalize the raw bottle absorption reading. In this manner, any drifts in the radiation source 20 signal or sensor 10 responsiveness are adequately tracked and filtered, making the system substantially self-calibrating.

Figure 1B:
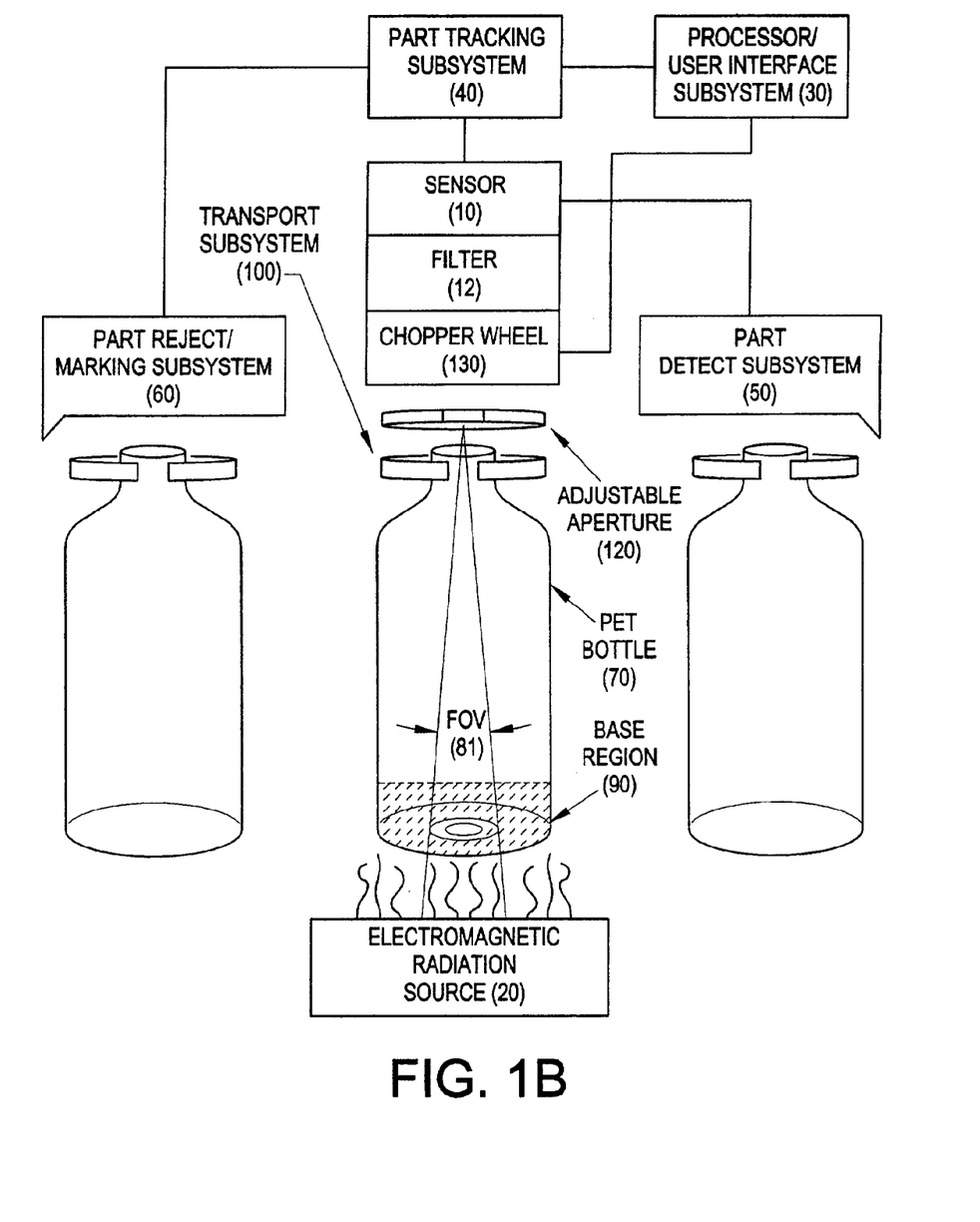
FIG. 1B is an illustration of an on-line mass/volume measurement system according to an alternate embodiment of the present invention.

Referring now to FIG. 1B, the system of FIG. 1A is shown where the field of view 81 is reduced as compared to field of view 80. Such a reduction is preferred in circumstances where more specific regions of the object or article are of interest for measurement and/or inspection.

Figure 1C:
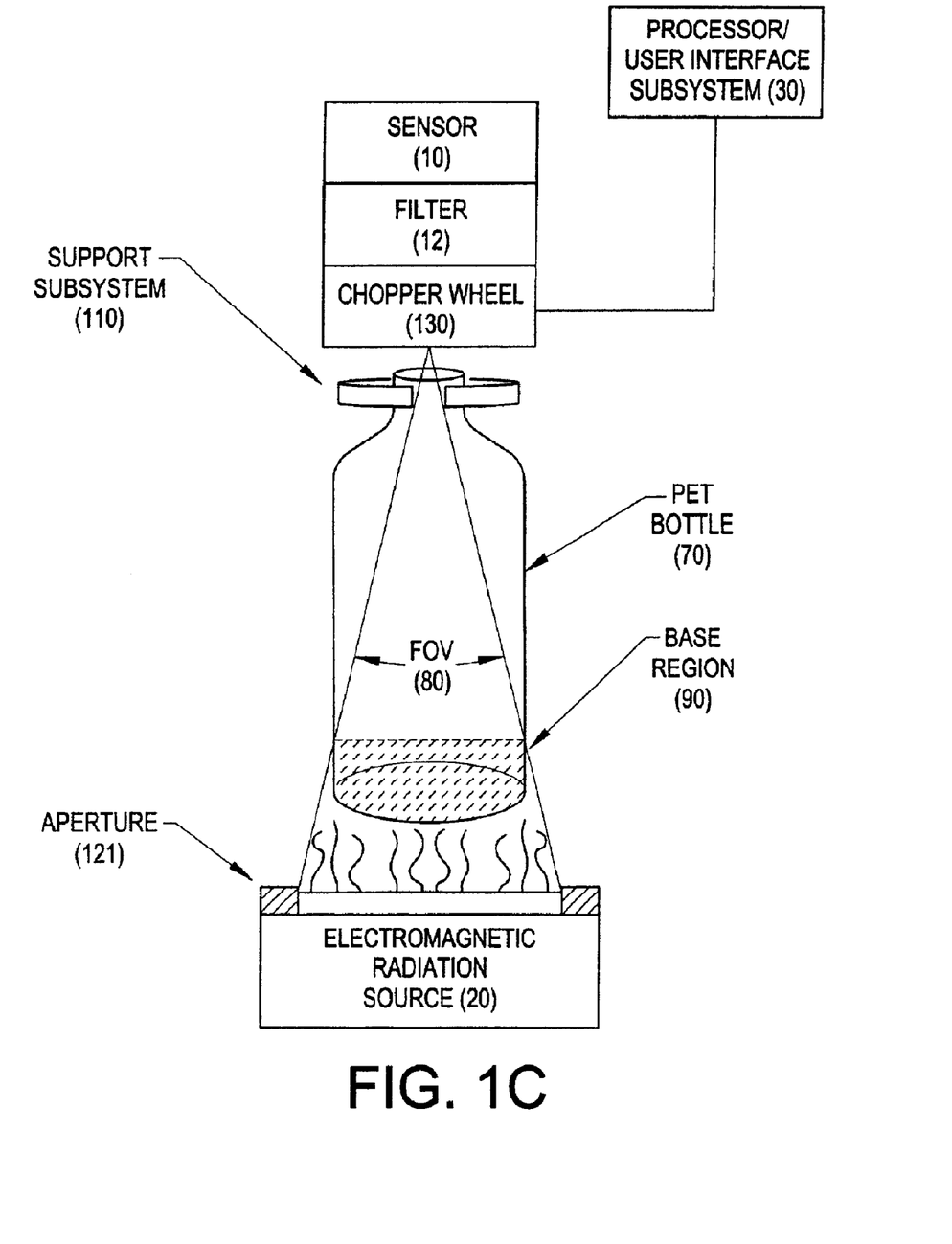
FIG. 1C is an illustration of an off-line mass/volume measurement system according to an alternate embodiment of the present invention.

Understanding that the subject invention is able to obtain a mass or volume measurement on the base region 90 of a PET bottle 70 without requiring that the bottle be destroyed, it is advantageous to explain an alternate embodiment which is illustrated in FIG. 1C. In this embodiment, with continuing reference to FIGS. 1A and 1B, the transport subsystem 100 of the preferred embodiment is replaced with another article positioning subsystem such as a support subsystem 110 and, additionally, the part tracking subsystem 40, part detect subsystem 50, and part reject/marking subsystem 60 are eliminated. In this embodiment, the PET bottle 70 is statically supported in place between the sensor 10 and the electromagnetic radiation source 20 using a suitable support subsystem 110. In this manner, off-line mass and/or volume measurements of the base region 90 of the PET bottle 70 are made without requiring that the bottle be destroyed in the process.

Also shown in FIG. 1C is an aperture plate 120 that is disposed over the radiation source 20, as opposed to being local to the sensor 10. It is to be appreciated that such a configuration may be used effectively in an on-line system (such as that shown in FIGS. 1A and 1B) as well.

Figure 2:
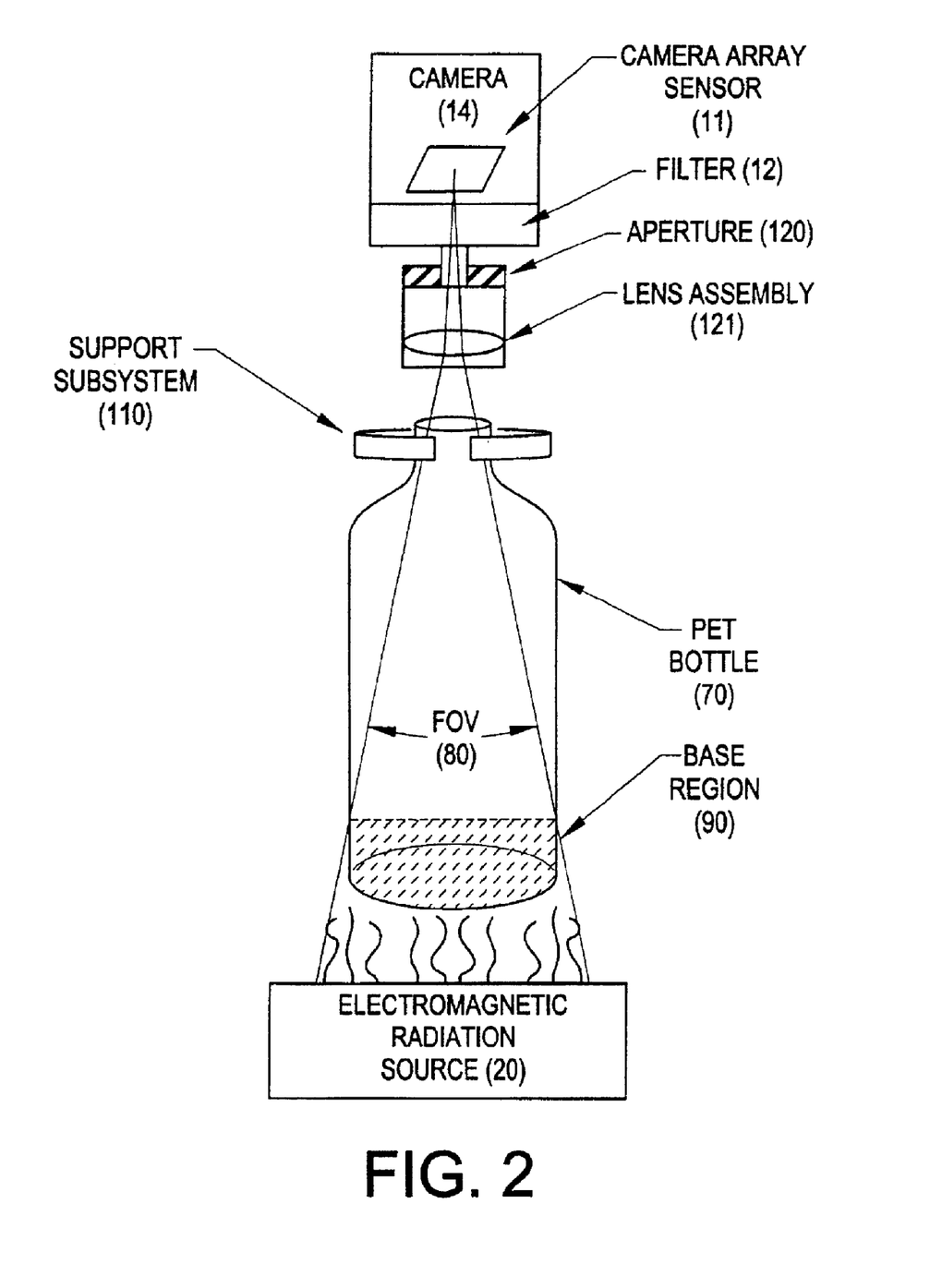
FIG. 2 is an illustration of an off-line mass/volume measurement system according to an alternate embodiment of the present invention.

Referring now to FIG. 2, a system utilizing a camera and lens system is illustrated. As shown, a camera 14 is used as the sensor 10. A filter 12, aperture mechanism or plate 120, and a lens assembly 121 are also incorporated into the system. This configuration can be used in an on-line system, such as that shown in FIGS. 1A and 1B, or an off-line system, such as that shown in FIG. 1C, as those of skill in the art will appreciate. The operation of the camera and lens system shown, as well as the interaction of that system with other components shown in FIGS. 1A and 1B, will be apparent to those skilled in the art having a full understanding of the present invention.

Figure 3A:
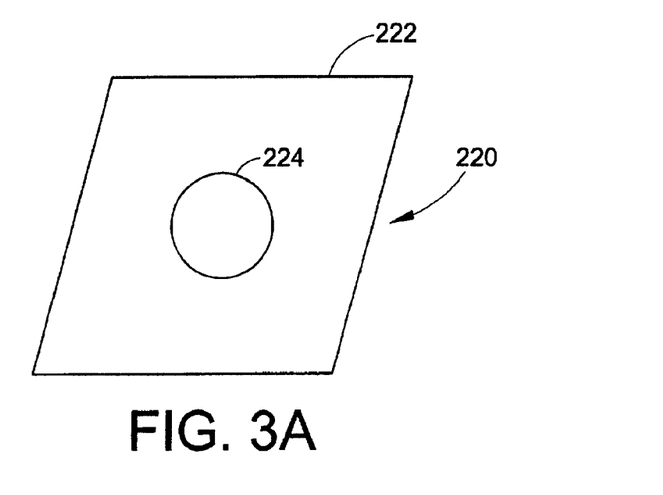
FIG. 3a is an illustration of an aperture plate suitable for use with embodiments of the present invention.
Figure 3B:
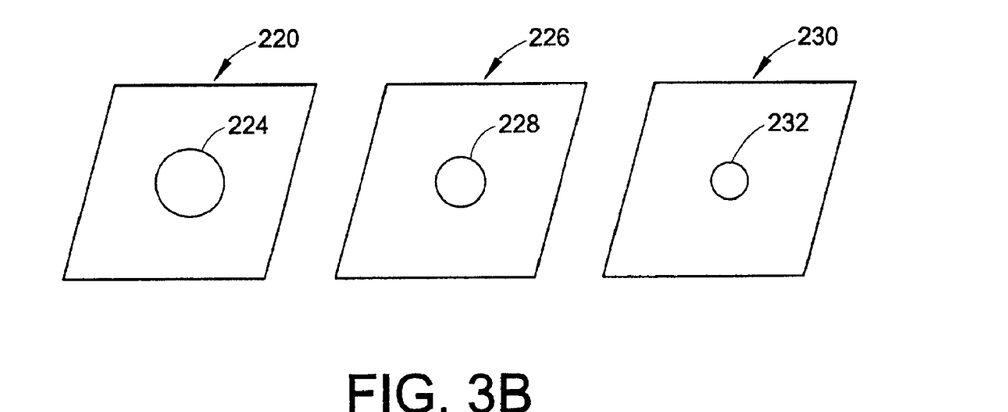
FIG. 3b is an illustration of aperture plates suitable for use with embodiments of the present invention.

The aperture mechanism or the adjustable aperture plate 120 shown in the preferred embodiment, can be advantageously employed in a variety of configurations. For example, FIG. 3a shows a fixed aperture plate 220, comprising a blocking material substrate 222 having an aperture 224. With continuing reference to FIG. 3a, FIG. 3b illustrates how fixed aperture plate 220 may be manually replaced, or optionally covered over, by aperture plates of varying sizes such as aperture insert plates 226 and 230, having respectively smaller apertures 228 and 232.

Figure 3C:
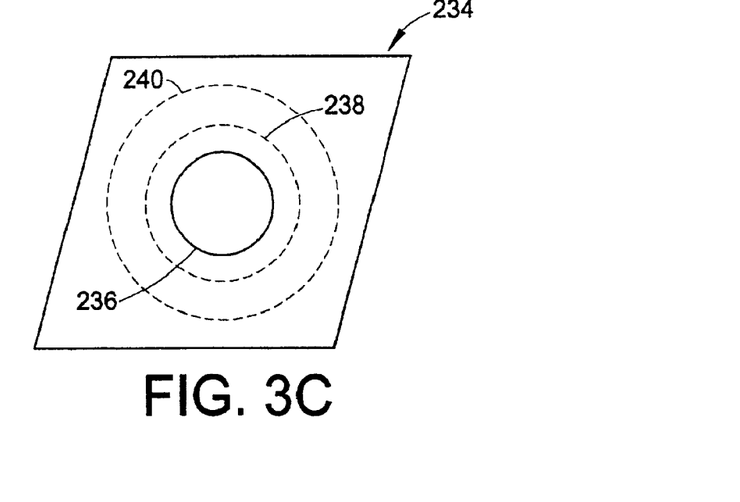
FIG. 3c is an illustration of a mechanically adjustable aperture plate suitable for use with embodiments of the present invention.
Figure 3D:
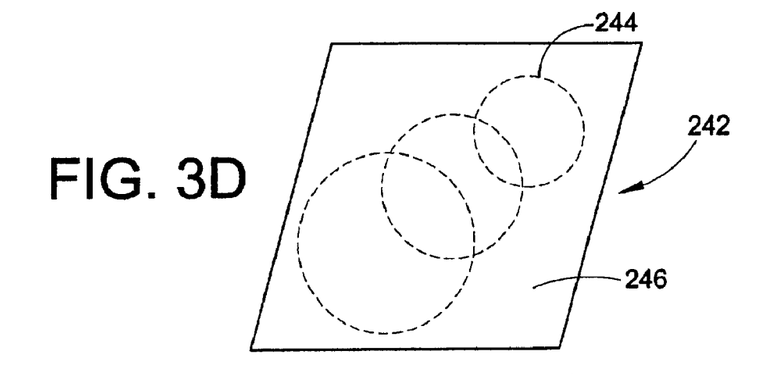
FIG. 3d is an illustration of an alternate mechanically adjustable aperture plate having an aperture of adjustable location and size.

The aperture mechanism may be configurable—both mechanically and electronically. FIG. 3c illustrates an alternate method of mechanically changing the size of the aperture. Adjustable aperture plate 234 comprises an aperture 236 that can be adjusted to alternate sizes such as apertures 238 and 240. Methods of constructing mechanically adjustable aperture plates by using, for example, multi-leaf shutters are well known in the art. FIG. 3d shows a mechanically adjustable aperture plate 242 wherein the aperture 244 may be adjusted in size in a manner similar to adjustable aperture plate 234, and may also be adjusted location-wise either by moving blocking material 246 or by moving an adjustable aperture plate portion mounted on blocking material 246. For example, adjustment mechanisms may be provided to translate the plate in the x and y directions either manually or through the use of servomotors and the like to enable remote, automatic adjustments.

Figure 4A:
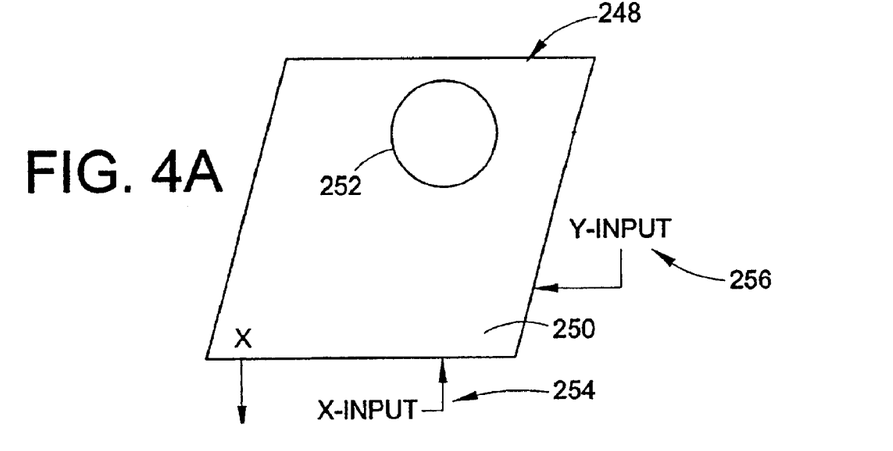
FIG. 4a is an illustration of an adjustable aperture plate comprising a programmable electro-optical blocking device.

FIG. 4a illustrates a programmable adjustable aperture plate 248. This may take the form of an electronically addressable spatial light modulator. Adjustable aperture plate 248 comprises a programmable electro-optical device or substrate 250 having a single transmissive window 252 forming an aperture of the desired size and location. For example, a liquid crystal display (LCD) device may be used. The programmable electro-optical substrate 250 includes an X input 254 and a Y input 256 for programming the size and location of the transmissive window 252. For example, the substrate 250 can be configured to have individual pixels, each corresponding to an X location and a Y location, wherein each pixel can be programmed into either a transmissive or an opaque state. In this manner, transmissive window 252 can be programmed to be any desired size in any desired location on substrate 250. Methods of programming an array of pixels on liquid crystal substrates are well known in the art.

Figure 4B:
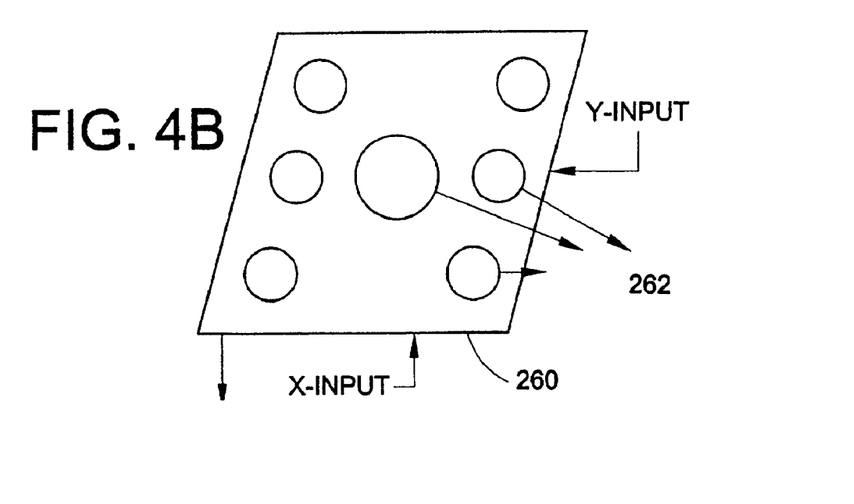
FIG. 4b is an illustration of an alternate programmable electro-optical blocking device having multiple transmissive windows.

With continuing reference to FIG. 4a, FIG. 4b shows an alternate programmable electro-optical blocking device or substrate 260. Programmable substrate 260 is like programmable substrate 250, however, it can be programmed to have multiple transmissive windows 262 in order to satisfy a wider range of needs and special conditions.

Figure 5:
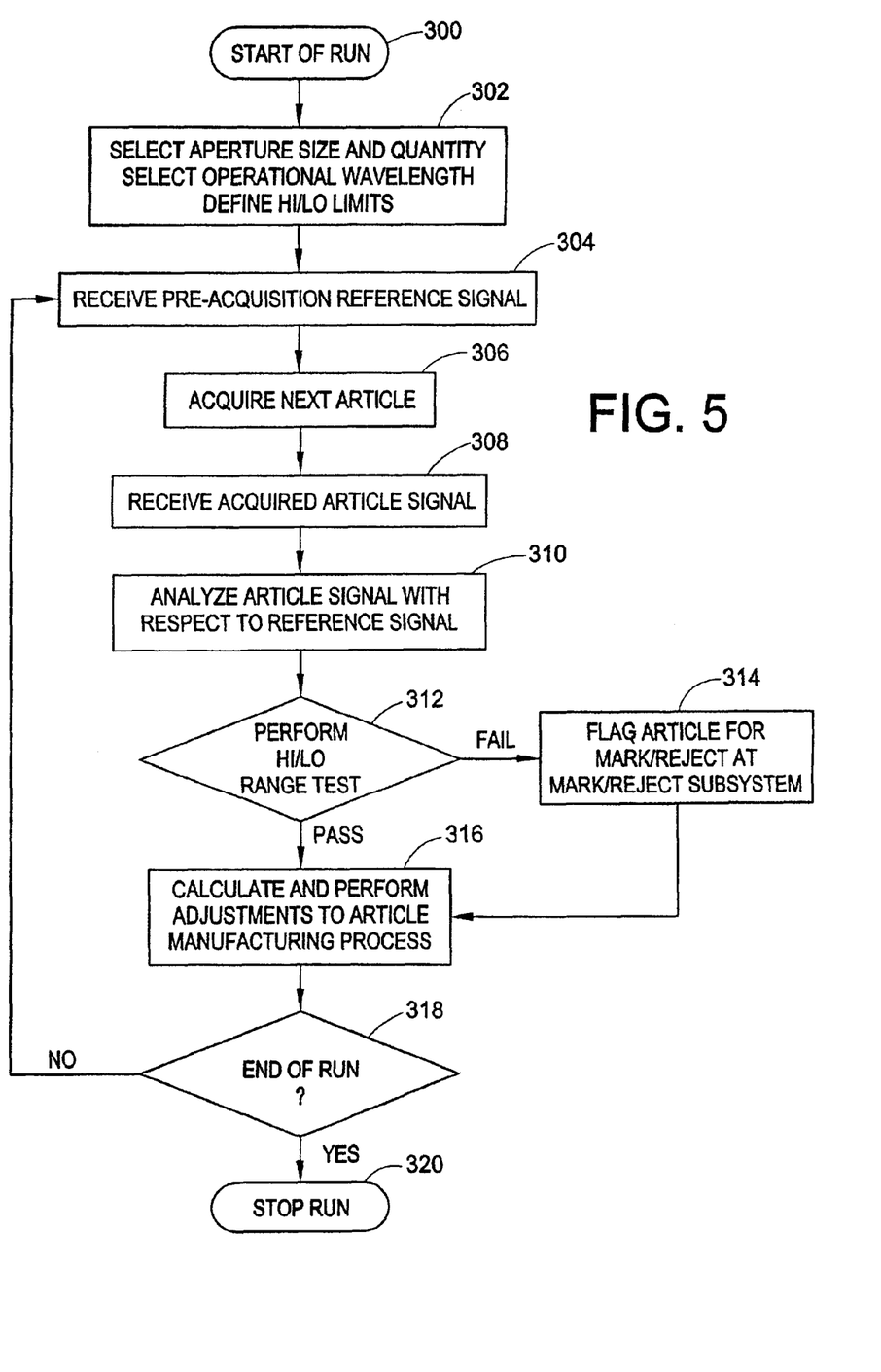
FIG. 5 is a flow diagram illustrating a method according to the present invention.

For the purpose of clarifying the overall concepts of the present invention as applied to an article manufacturing system, FIG. 5 provides a flow diagram illustrating the overall process wherein the objects to be inspected or measured are transported into a field of view. At the start of a new run, at step 300, a user or program selects the desired aperture size, or sizes in the case of multiple apertures, at step 302. The selected aperture(s) define the desired FOV for succeeding mass and/or volume measurements. As part of the same step, one or more operational wavelength ranges are also selected. HI/LO threshold limits for mass or volume measurements may also be selected.

As the first step in a repetitive cycle, at step 304, a pre-acquisition, unobstructed reference signal is received by sensor 10 and processed by processor subsystem 30. It is to be understood that all received signals illustrated in the flow diagram may be single signals or an average of multiple repetitive signals. A plurality of signals may also represent a plurality of operational wavelength wherein each wavelength has its own related set of parameters, such as HI/LO limits for example. In such a case, sensor apparatus 10 would normally have multiple sensors with each sensor sensitive to selected wavelengths. As noted above, the sensor may also comprise a camera. At step 306, an article or object is acquired from transport subsystem 100 for mass and/or volume measurements. At step 308, article signals are received in a manner similar to the above-described receiving of reference signals, however, article signals are absorption-based, depending on the mass and/or volume of article present within the selected FOV.

The received article absorption-based signal(s) are analyzed with respect to the reference signal(s) at step 310 to, for example, obtain a mass or volume measurement. Based on results of the analysis, at step 312, a HI/LO range test is performed to determine if the results of the analysis fall within a particular range, and processing is directed to step 314 if the current article fails the test or is directed to step 316 if it passes the HI/LO range test. Articles that fail testing are flagged for marking/rejection at step 314. The part tracking subsystem 40 tracks the flagged articles, and the part reject/marking subsystem 80 either rejects (by ejection to a discard bin for example) or marks the flagged articles as they arrive at the reject/marking subsystem.

The concepts of the present invention also provide for a closed-loop configuration, enabling optional adjustments to the manufacturing process based on the analysis of the absorption-based signal(s) with respect to the reference signal(s). Corrective adjustments, if necessary, are made at step 316. It is to be understood that these adjustments may be made based on pre-determined criteria and may be based on individual article measurements and/or averages of multiple article mass and/or volume measurements (running averages, for example).

Further, such adjustments may be initiated or implemented manually by an operator of the system after viewing data calculated by the system on the user interface/processor 30. Similarly, adjustments may be carried out semi-automatically through the intervention of an operator who interprets data displayed on the user interface 30 and initiates automated process controls to implement the adjustments. Moreover, the adjustment process may be implemented in a fully automatic fashion whereby the system calculates mass or volume metrics, feeds such data back to the interface/processor 30, and then implements necessary adjustments through suitable components of the system based on predetermined criteria.

Step 318 determines if the end of a run has been reached, either by user intervention or by a signal from the manufacturing process for example, and returns to step 304 for processing succeeding articles if it is not the end of a run. Processing stops at step 320 when the end of a run has been signaled.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

What is claimed is:

1. A system for providing measurements of manufactured articles formed of material comprising:

an article positioning subsystem adapted to place an article in at least one selected position for mass or volume measurements;

a signal source of electromagnetic radiation supplying at least one of infrared energy and ultraviolet energy wherein at least a portion of an emitted wavelength spectrum is partially absorbed by the article to produce an absorption-based signal representing an amount of adsorption occurring at all of a plurality of points within a selected region of the article;

a sensor apparatus configured to detect the absorption-based signal and produce at least one of an analog output and a digital output based on the signal;

a field of view established between the sensor apparatus and the selected region of the article; and a processor configured to receive the output of the sensor apparatus and compute a mass or volume of the selected region of the article.

2. The system as set forth in claim 1 wherein the sensor apparatus comprises a single sensor.

3. The system as set forth in claim 2 wherein the sensor apparatus is provided with an optical bandpass filter integrated into an optical path of the sensor apparatus that limits radiation responsiveness to specific wavelength ranges wherein advantageous absorption of the emitted wavelength spectrum takes place.

4. The system as set forth in claim 2 wherein the sensor apparatus comprises a detector element whose natural and limited responsiveness to radiation acts to limit responsiveness to specific wavelength ranges wherein advantageous absorption of the emitted wavelength spectrum takes place.

5. The system as set forth in claim 2 wherein the sensor apparatus is provided with a rotating or oscillating chopper wheel which acts to modulate received signals at a known electrical frequency advantageous to subsequent signal processing operations.

6. The system as set forth in claim 2 wherein a user of the system configures a processor via a user interface with an expected mass and/or volume parameter, and wherein the processor performs a measurement and thresholding analysis on measured data.

7. The system as set forth in claim 6 further including a process correction means wherein corrective adjustments are initiated based on the analysis.

8. The system as set forth in claim 7 wherein the corrective adjustments are performed by one of:

a manual adjustment;

a semi-automatic adjustment; and an automatic adjustment.

9. The system as set forth in claim 1 wherein the sensor apparatus comprises multiple sensors.

10. The system as set forth in claim 9 wherein individual sensors comprising the multiple sensors each are used to obtain data from a unique portion or an overlapping portion of the article.

11. The system as set forth in claim 9 wherein individual sensors comprising the multiple sensors each are used to obtain data from a different material type contained within the article.

12. The system as set forth in claim 9 wherein the sensor apparatus is provided with at least one optical bandpass filter integrated into an optical path of the sensor apparatus that limits radiation responsiveness to specific wavelength ranges wherein advantageous absorption of the emitted wavelength spectrum takes place.

13. The system as set forth in claim 9 wherein the sensor apparatus comprises at least one detector element whose natural and limited responsiveness to radiation acts to limit responsiveness to specific wavelength ranges wherein advantageous absorption of the emitted wavelength spectrum takes place.

14. The system as set forth in claim 9 wherein the sensor apparatus is provided with at least one chopper wheel which acts to modulate received signal(s) at a known electrical frequency advantageous to subsequent signal processing operations.

15. The system as set forth in claim 1 wherein the sensor apparatus comprises a camera.

16. The system as set forth in claim 15 wherein the sensor apparatus is provided with an optical bandpass filter integrated into an optical path of the sensor apparatus that limits radiation responsiveness to specific wavelength ranges wherein advantageous absorption of the emitted wavelength spectrum takes place.

17. The system as set forth in claim 15 wherein the sensor apparatus comprises a detector array element whose natural and limited responsiveness to radiation acts to limit responsiveness to specific wavelength ranges wherein advantageous absorption of the emitted wavelength spectrum takes place.

18. The system as set forth in claim 15 wherein the sensor apparatus is provided with a chopper wheel which acts to modulate received signals at a known electrical frequency advantageous to subsequent signal processing operations.

19. The system as set forth in claim 15 wherein a user of the system configures a processor via a user interface with an expected mass and/or volume parameter, and wherein the processor performs a measurement and thresholding analysis on measured data.

20. The system as set forth in claim 19 further including a process correction means wherein corrective adjustments are initiated based on the analysis.

21. The system as set forth in claim 20 wherein the corrective adjustments are performed by one of:

a manual adjustment;

a semi-automatic adjustment; and an automatic adjustment.

22. The system as set forth in claim 1 wherein the electromagnetic radiation source is provided with an optical bandpass filter integrated into an optical path thereof that limits radiation responsiveness to specific wavelength ranges wherein advantageous absorption of the emitted wavelength spectrum takes place.

23. The system as set forth in claim 22 further comprising a chopper wheel which acts to modulate received signals at a known electrical frequency advantageous to subsequent signal processing operations.

24. The system as set forth in claim 1 wherein the electromagnetic radiation source has a natural and limited emission spectrum that acts to limit responsiveness to specific wavelength ranges wherein advantageous absorption of the emitted wavelength spectrum takes place.

25. The system as set forth in claim 24 wherein the electromagnetic radiation source is comprised of solid state light emitting diodes.

26. The system as set forth in claim 25 wherein the light emitting diodes are electrically pulsed in order to modulate received signals at a known electrical frequency advantageous to subsequent signal processing operations.

27. The system as set forth in claim 24 wherein the electromagnetic radiation source is provided with a rotating or oscillating chopper wheel which acts to modulate received signals at a known electrical frequency advantageous to subsequent signal processing operations.

28. The system as set forth in claim 1 wherein the field of view is established by an imaging lens.

29. The system as set forth in claim 1 wherein the field of view is established using an aperture mechanism.

30. The system as set forth in claim 29 wherein the aperture mechanism is implemented as an aperture plate localized to the sensor apparatus.

31. The system as set forth in claim 29 wherein the aperture mechanism is implemented as an aperture plate localized to the electromagnetic radiation source.

32. The system as set forth in claim 1 wherein the field of view is established using multiple aperture plates.

33. The system as set forth in claim 32 wherein the aperture plates are localized to the sensor apparatus.

34. The system as set forth in claim 32 wherein the aperture plates are localized to the electromagnetic radiation source.

35. The system as set forth in claim 1 wherein the field of view is established using a configurable aperture mechanism.

36. The system as set forth in claim 35 wherein the configurable aperture mechanism is an electronically addressable spatial light modulator.

37. The system as set forth in claim 35 wherein the configurable aperture mechanism is a mechanically adjustable aperture.

38. The system as set forth in claim 35 wherein the mechanically adjustable aperture is servo-motor driven.

39. The system as set forth in claim 1 wherein the article positioning system is an article support subsystem for off-line mass and/or volume measurements.

40. The system as set forth in claim 1 wherein a user of the system configures a processor via a user interface with an expected mass and/or volume parameter, and wherein the processor performs a measurement and thresholding analysis on measured data.

41. The system as set forth in claim 40 wherein the article positioning system is an article transport subsystem for on-line mass and/or volume measurements.

42. The system as set forth in claim 41 further including:
a part detect subsystem configured to detect articles placed for mass or volume measurements by the article transport subsystem;
a part tracking subsystem configured to track article positions in the article transport subsystem; and
a part reject/marking subsystem configured to selectively remove or mark articles rejected based on the volumetric measurement verification.

43. The system as set forth in claim 40 further including a process correction means wherein corrective adjustments are initiated based on the analysis.

44. The system as set forth in claim 43 wherein the corrective adjustments are performed by one of:
a manual adjustment;
a semi-automatic adjustment; and
an automatic adjustment.

45. The system as set forth in claim 1 wherein a user of the system configures a processor via a user interface with an expected mass and/or volume parameter, and wherein the processor performs a measurement and thresholding analysis on measured data.

46. A method for providing measurements on articles of manufacture in a system using a radiation source and a sensor, the method comprising the steps of:
generating a first signal based on at least one of infrared and ultraviolet radiation emitted from the radiation source and detected by the sensor;
positioning an article in a field of view established between the radiation source and the sensor;
generating a second signal based on radiation emitted from the radiation source, partially absorbed by the article, the unabsorbed portion of the radiation being detected by the sensor and representing an amount of absorption occurring at all of a plurality of points within a selected region of the article; and
analyzing the first signal and the second signal to obtain one of a mass and volume measurement of a portion of the article within the selected region.

47. The method as set forth in claim 46 further comprising the process of determining whether the article is acceptable based measured mass/or volume value and user established limits.

48. The method as set forth in claim 47 further comprising performing adjustments to a manufacturing process for the article based on the analyzing and the determining.

* * * * *